US006666229B2

United States Patent
Gil et al.

(10) Patent No.: US 6,666,229 B2
(45) Date of Patent: Dec. 23, 2003

(54) NOISE REDUCING HOUSING FOR TOILET TANK FILL VALVE

(75) Inventors: Amos Gil, Haifa (IL); Bruce Higgins, South Lyon, MI (US); Bradley E. Allstead, Trenton, MI (US)

(73) Assignee: Brass-Craft Manufacturing Company, Novi, MI (US)

( * ) Notice: Subject to any disclaimer, the term of this patent is extended or adjusted under 35 U.S.C. 154(b) by 0 days.

(21) Appl. No.: 10/108,087

(22) Filed: Mar. 27, 2002

(65) Prior Publication Data

US 2003/0183277 A1 Oct. 2, 2003

(Under 37 CFR 1.47)

(51) Int. Cl.[7] ............... F16K 47/02; F16K 47/04
(52) U.S. Cl. ......................... 137/436; 137/435
(58) Field of Search ............... 137/218, 435, 137/436, 441

(56) References Cited

U.S. PATENT DOCUMENTS

| 2,635,622 | A | * | 4/1953 | Owens ................ 137/218 |
| 3,070,118 | A | * | 12/1962 | Antunez, Jr. ........... 137/436 |
| 3,785,394 | A | * | 1/1974 | Dixon et al. ........... 137/436 |
| 3,785,397 | A | * | 1/1974 | Young ................ 137/436 |
| 4,494,562 | A | * | 1/1985 | Stephens .............. 137/436 |
| 6,192,916 | B1 | * | 2/2001 | Antunez, Jr. et al. ...... 137/436 |

\* cited by examiner

Primary Examiner—George L. Walton
(74) Attorney, Agent, or Firm—Edgar A. Zarins; Lloyd D. Doigaan

(57) ABSTRACT

A fill valve assembly for a toilet tank which reduces the fluid noise associated with filling of the tank. The fill assembly includes a fill tube mounted within the tank for delivering water. A fill housing is mounted to the upper end of the fill tube and includes a fill valve operably connected to a float. The float will open the valve when the water in the tank drops below a predetermined level and shuts off the valve when the fluid reaches the level. The interior of the housing includes structure for forming a laminar fluid flow out of the valve which reduces the fluid noise associated with filling the tank.

13 Claims, 3 Drawing Sheets

NOISE REDUCING HOUSING FOR TOILET TANK FILL VALVE

BACKGROUND OF THE INVENTION

I. Field of the Invention

This invention relates to fill valves for controlling the water level in a toilet tank and, in particular, to a housing for the fill valve which reduces the water flow noise when the valve is open to fill the toilet tank.

II. Description of the Prior Art

Modern toilets continue to use the flow of water from a reservoir tank to flush waste into the sewage system of the dwelling. In the typical gravity flow toilet, water stored in the reservoir tank is released into the toilet bowl upon tripping the flush lever. The reduced water level drops the float thereby activating the fill valve. Once the water level reaches a predetermined level, the fill valve is shut off as the float reaches the intended position.

As with any valve, the flow of water from an outlet creates a certain level of noise. Attempts have been made to reduce the level of water noise created by the fill valve both by adding insulative structure and adjusting the configuration of the valve to more gently deliver the water to the interior of the tank. For the most part, these adjustments have proven unsuccessful or limited by the structure of the fill valve. Since the cascade of water into the tank created considerable noise, prior known fill assemblies moved the fill valve lower into the tank. However, the concern that a backflow may be created under certain circumstances resulted in the regulations requiring that the valve be above the water line within the tank. Thus, a valve structure which reduces the flow noise without adding considerable structure and therefore cost to the fill assembly is desirable.

SUMMARY OF THE PRESENT INVENTION

The present invention overcomes the disadvantages of the prior known toilet tank fill valve housings by providing structure to reduce the noise associated with the flow of water from the fill valve.

The fill valve assembly of the present invention includes a fill tube connected to the water supply and extending upwardly from the floor of the tube. Formed at the upper end of the fill tube is a valve housing having a fill valve disposed therein. The fill valve is preferably seated at an outlet of the fill tube to control the flow of water from the fill tube through the valve housing into the toilet tank. Operation of the fill valve is controlled through the float arm which is mounted to the housing and attached to the float. As the float arm pivots downwardly along with the float in response to a drop in water level, the fill valve will be opened to permit the flow of water into the tank. Once the water within the tank has reached a predetermined level, the float arm will operate to close the fill valve.

In a preferred embodiment of the present invention, the valve housing includes a lower housing portion connected to or integrally formed with the fill tube and an upper housing portion detachably mounted to the lower housing portion. Noise reduction structure is formed within the interior of the valve housing to quiet the flow of water exiting the fill tube. The noise reduction structure of the present invention comprises a cylindrical ring coaxial with the fill valve which forms an annular slot through which the water flows. The annular slot creates a laminar flow discharging from the fill valve which has a less turbulent splash thereby reducing the flow noise. The annular slot may be formed combining structure from both the lower housing and upper housing portions or through one portion alone.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the view and in which.

DETAILED DESCRIPTION OF A PREFERRED EMBODIMENT OF THE PRESENT INVENTION

Figure 1:
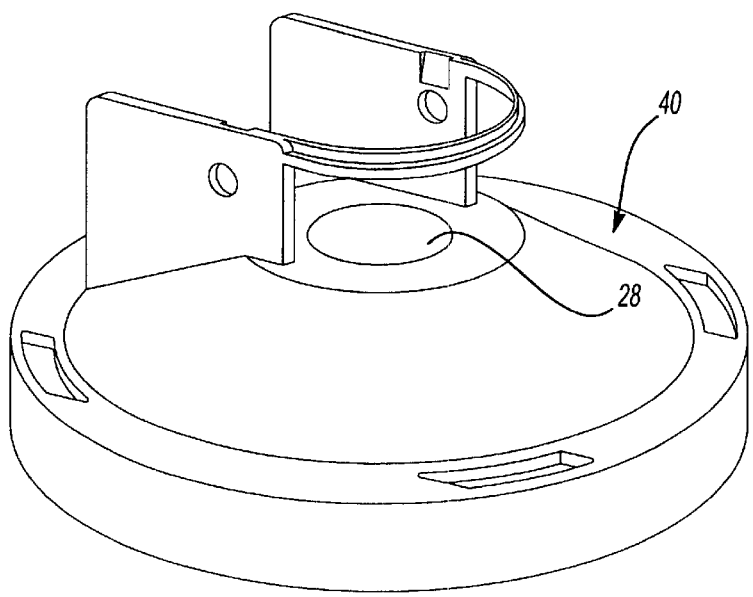
FIG. 1 is a perspective view of an upper housing portion embodying the present invention.
Figure 2:
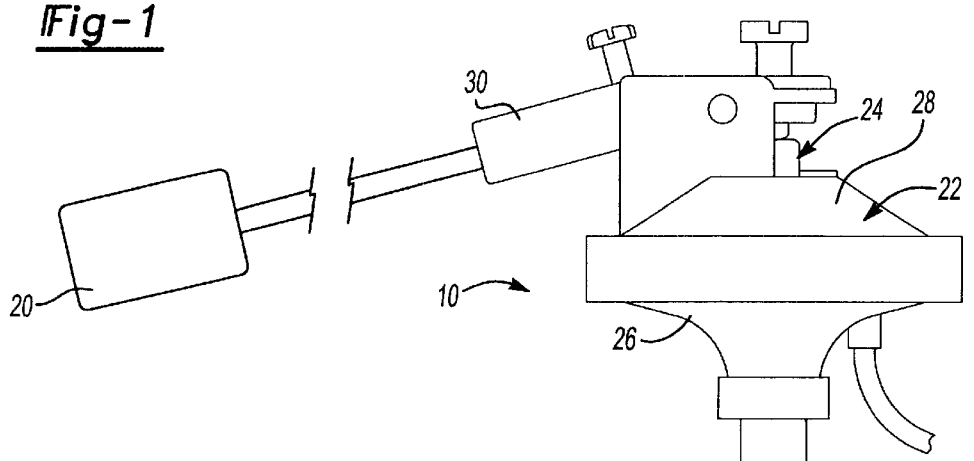
FIG. 2 is a side plan view of the fill assembly mounted within a toilet tank.
Figure 2:
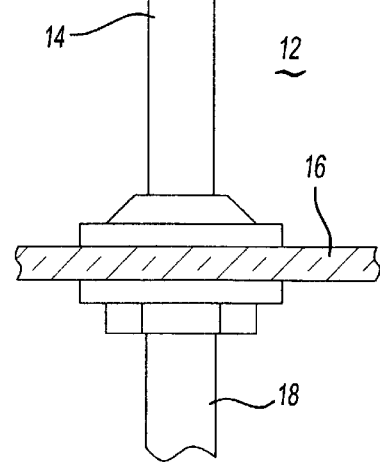

Referring first to FIG. 2, there is shown a fill valve assembly 10 to control the water level in a toilet tank 12. A preferred embodiment of the fill assembly 10 includes a riser tube 14 which is secured to a bottom wall 16 of the tank 12 in fluid communication with a water supply line 18. The fill assembly 10 is designed to maintain the water level within the toilet tank 12 in order to provide sufficient water for each flush. The water level is determined according to the position of float 20 which is pivotally attached to the fill assembly 10. With each flush of the toilet, the tank 12 is emptied causing the float to move downwardly thereby operating the fill valve assembly 10. Once the water level has reached a predetermined level within the tank 12, the float 20 will be moved to its start position which closes the fill valve 10.

Figure 3:
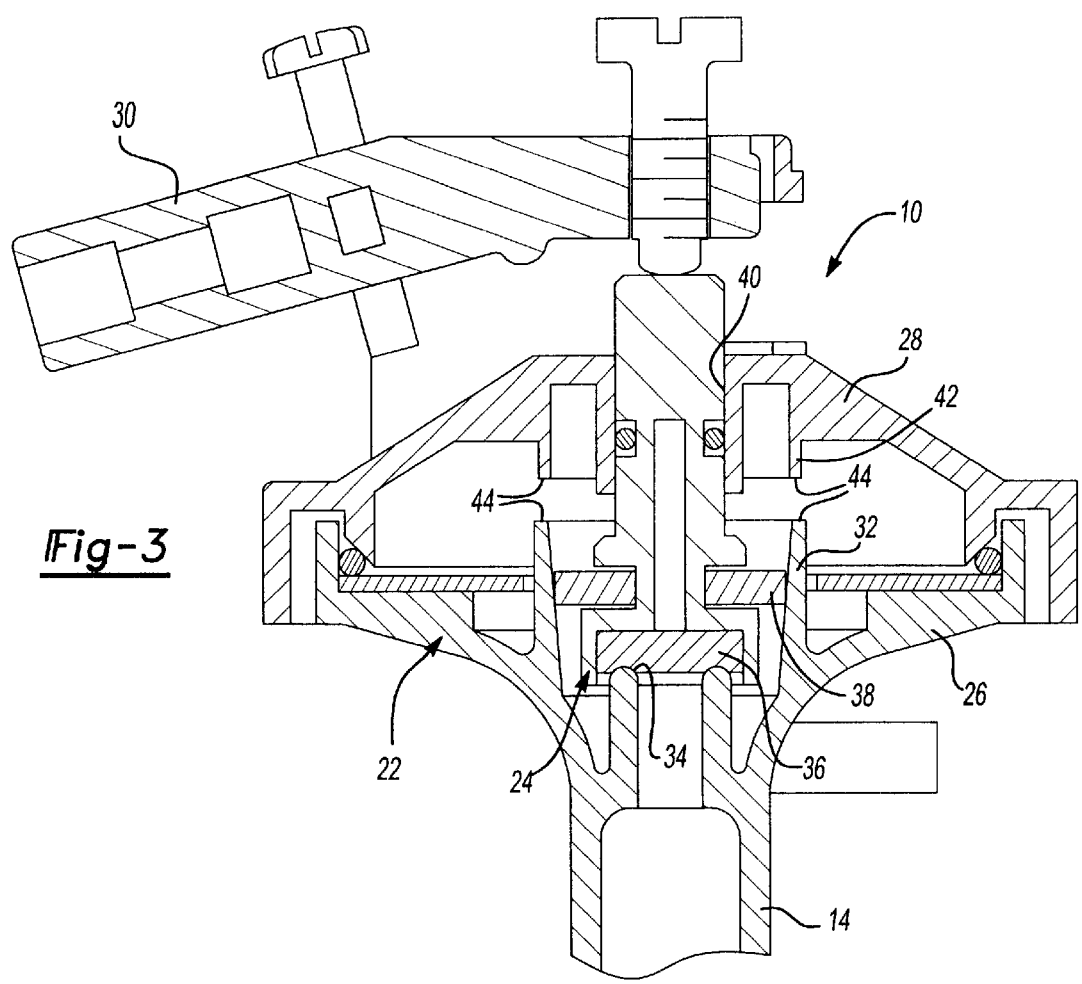
FIG. 3 is a cross-sectional view of the fill assembly in a closed position.
Figure 4:
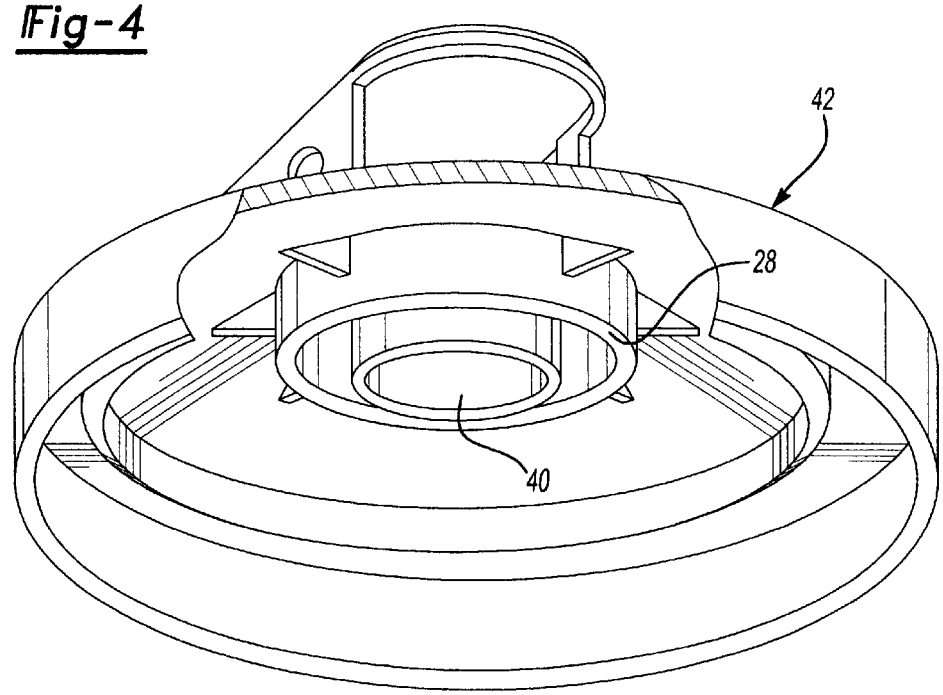
FIG. 4 is a bottom perspective view of the upper housing portion.
Figure 5:
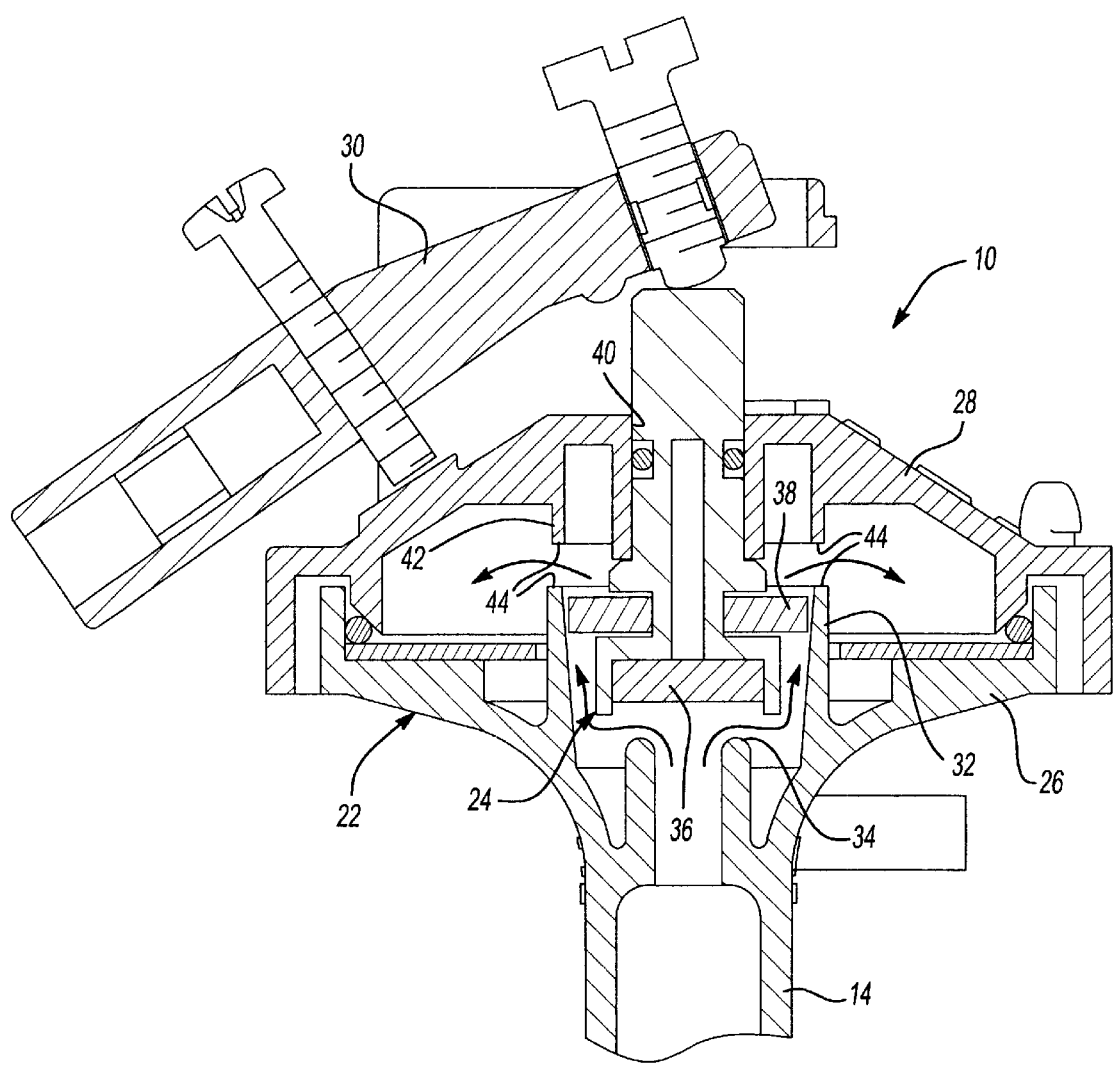
FIG. 5 is a cross-sectional view of the valve assembly in an open position.

As is best shown in FIGS. 3 and 5, disposed at the upper end of the riser tube 14 is a valve housing 22 which houses a valve 24 to control the flow of water from the riser tube 14 into the toilet tank 12. In a preferred embodiment of the present invention, the valve housing 22 includes a lower housing portion 26 integrally molded with the riser tube 15 and an upper housing portion 28 detachably mounted to the lower housing portion 26 to enclose the valve 24. A float arm 30 is pivotably attached to the upper housing portion 28 for pivoting motion in connection with the rise and lowering of the water level.

The lower housing portion 26 includes a valve body 32 which reciprocally receives the valving member 24 and a valve seat 34 at the end of the riser tube 14 for delivering water through the valve housing 22. The valving member 24 selectively engages the valve seat 34 in accordance with operation of the valve 24 to control the water flow from the riser 14. Preferably, the valving member 24 has a sealing disc 36 at its lower end to sealingly engage the valve seat 34. Additionally, the valving member 24 includes a throttle washer 38 which includes a throttle washer 38 which is precisely sized in relation to the inside diameter of the valve body 32 to facilitate opening and closing of the valve 24. The throttle washer 38 has an annular notch 39 along its outer diameter to regulate fluid flow. With the valve 24 open, the throttle washer 38 flexes away from the force of the fluid flow. As the float rises and the sealing disc 36 nears the valve seat 34, the flow of water is reduced allowing the throttle washer 38 to flatten out thereby reducing flow past the outer edge of the throttle washer 38 causing a pressure drop. This pressure drop allows a quick final movement of the valve 24 towards the valve seat 34 to "snap" the valve 24 fully closed. Conversely, upon flushing, the throttle washer 38 provides a delay to opening of the valve 24. Once a significant amount of water has flowed from the tank 12, the valve 124 will quickly open as the pressure differential reaches a predetermined level. An upper end of the valving member 24 engages the float arm 30 for movement in response to movement of the float 20.

Formed in the upper housing portion 28 is a throughbore 40 which serves as a guide for the reciprocating valving member 24, allowing the valving member 24 to extend through the top of the upper housing portion 28 for engagement with the float arm 30. Formed concentrically with the throughbore 40 is a cylindrical ring formed which extends downwardly within the housing 22. Preferably, the cylindrical ring 42 and the valve body 32 so as to form an annular slot 44 which encircles the valving member 24 and form an outlet for the water flow into the housing 22. The annular slot 44 creates a laminar flow to the discharge which is less turbulent and therefore a quieter water flow than the normal discharge.

Operation of the fill assembly 10 of the present invention provides quieter filling of the toilet tank following a flush which will cause the float 20 to drop downwardly decreasing the closing force on the valve assembly. The pressure of the incoming water acts on the sealing disc to begin opening the valve assembly. The pressure in the chamber between the thrust washer and the valve seat increases. Since the pressure below the thrust washer is greater than the pressure above, the opening force increases, and the valve is pushed up. Upon closing the valve, the force acting on the throttle washer creates the need for a greater closing force from the float. The need for the additional closing force, in effect, delays the closing until the additional force requirement is met (flotation of float ball due to rising water level). When the closing force on the valve assembly from the float exceeds the opening force (from throttle washer and force on the valve seal) the valve closes, shutting off the water. With no water flow across the throttle washer, the opening force due to the throttling washer goes to zero. Resulting in a net closing force on the valve assembly that is sufficiently large to avoid leaking past the valve seal in the event the line pressure fluctuates.

With the flow passageway open, water will flow from the riser tube 14 past the valve seat 34 to fill the valve body 32. As the water flow exits through the annular slot 44 into the housing 22, a laminar sheet of water will be formed creating a quieter discharge of the water. The water will flow from the housing 22 into the toilet tank 12 causing the float 20 to rise with the water level. As the level rises, the arm 30 will pivot moving the valving member 24 downwardly until it engages the seat 34 shutting off flow. The valving member 24 will remain closed until the float 20 is again lowered as a result of flushing the toilet.

The foregoing detailed description has been given for clearness of understanding only and no unnecessary limitations should be understood therefrom as some modifications will be obvious to those skilled in the art without departing from the scope and spirit of the appended claims.

What is claimed is:

1. A fill assembly for controlling a fluid level within a fluid reservoir, said fill assembly mounted within the fluid reservoir in fluid communication with a fluid supply, said assembly comprising:

a fluid inlet tube adapted to be mounted within the fluid reservoir in fluid communication with the fluid supply;

a valve housing disposed at an upper end of said fluid inlet tube, said valve housing having at least one fluid outlet for delivering fluid to the reservoir;

a fill valve disposed within said valve housing for selectively controlling fluid flow from said inlet tube into said valve housing; and means for detecting the fluid level within said fluid reservoir, said means operatively connected to said fill valve such that said fill valve is moved to an open position when said fluid level drops below a predetermined level allowing fluid from said inlet tube to flow through said housing into said inlet tube to flow through said housing into said reservoir and said fill valve moved to a closed position when said fluid level reaches said predetermined level;

said valve housing including a cylindrical ring concentric with said fill valve, said cylindrical ring forming an annular slot within said valve housing whereby fluid from said inlet when said fill valve is in said open position flows through said annular slot to said at least one fluid outlet with less turbulence to reduce fluid flow noise within said housing.

2. The fill assembly as defined in claim 1 wherein said fluid inlet tube has a valve seat, said fill valve selectively sealingly engageable with said valve seat to prevent fluid flow from said inlet.

3. The fill assembly as defined in claim 2 wherein said valve housing includes a cylindrical valve body, said fill valve reciprocally movable within said valve body in response to said detecting means, said valve body cooperating with said cylindrical ring to form said annular slot for flow noise reduction.

4. The fill assembly as defined in claim 3 wherein said means for detecting the fluid level within said reservoir comprises a float assembly pivotably mounted to said valve housing, said float assembly engaging said fill valve such that pivoting movement of said float assembly below said predetermined fluid level moves said fill valve off of said valve seat allowing fluid flow through said annular slot.

5. The fill assembly as defined in claim 4 wherein said valve housing includes a lower housing portion disposed at said upper end of said inlet tube and an upper housing portion detachably mounted to said lower housing portion.

6. The fill assembly as defined in claim 5 wherein said cylindrical ring is formed within said upper housing portion, said cylindrical ring extending downwardly from an interior wall of said upper housing portion.

7. The fill assembly as defined in claim 5 wherein said valve body is formed within said lower housing portion, said valve body extending upwardly from an interior wall of said lower housing portion.

8. The fill assembly as defined in claim 3 wherein said fill valve includes a throttle washer mounted thereto for cooperation with said cylindrical valve body to regulate the flow of fluid through said fill assembly.

9. A fill assembly for controlling a fluid level within a fluid reservoir, said fill assembly mounted within the fluid reservoir in fluid communication with a fluid supply, said fluid assembly comprising:

a fluid inlet tube adapted to be mounted within the fluid reservoir in fluid communication with the fluid supply, said fluid inlet tube having a valve seat;

a valve housing disposed at an upper end of said fluid inlet tube, said valve housing having a fluid outlet for delivering fluid to the reservoir;

a fill valve disposed within said valve housing for reciprocal movement between a closed position sealingly engaging said valve seat and an open position permitting fluid flow from said inlet tube into said valve housing; and a float assembly pivotably attached to said valve housing and operatively engaging said fill valve, said float assembly pivoting downwardly in response to a drop in fluid level thereby moving said fill valve to said open position and said float assembly pivoting upwardly to move said fill valve to said closed position when the fluid level within said reservoir reaches a predetermined level;

said valve housing including a cylindrical ring extending downwardly within said housing concentric with said fill valve, said cylindrical ring forming an annular slot within said valve housing whereby fluid from said inlet when said fill valve is in said open position flows through said annular slot in a laminar flow pattern to reduce fluid flow noise within said housing.

10. The fill assembly as defined in claim 9 wherein said valve housing includes a lower housing portion disposed at said upper end of said inlet tube and an upper a housing portion detachably mounted to said lower housing portion.

11. The fill assembly as defined in claim 10 wherein said cylindrical ring extends downwardly from an interior wall of said upper housing portion.

12. The fill assembly as defined in claim 11 wherein said housing portion includes a cylindrical valve body reciprocally receiving said fill valve, said valve body extending upwardly within said lower housing portion, said valve body cooperating with said cylindrical ring to form said annular slot.

13. The fill assembly as defined in claim 12 wherein said fill valve includes a throttle washer mounted thereto for cooperation with said cylindrical valve body to regulate the flow of fluid through said fill assembly.

\* \* \* \* \*